Dec. 13, 1927.
C. J. HOLUB
1,652,827
DOUBLE WALL CONDUCTOR PIPE
Filed Jan. 25, 1923
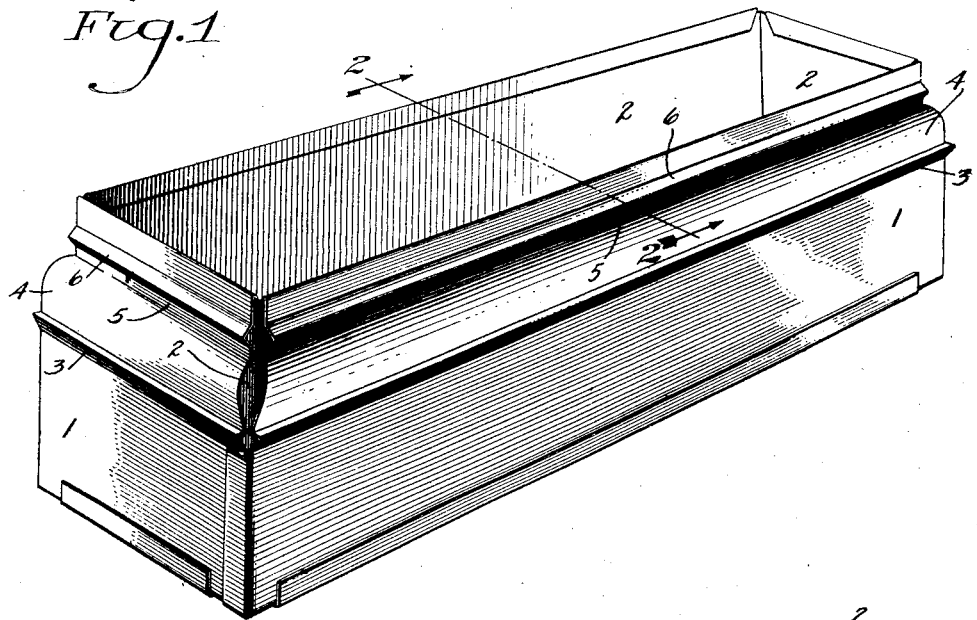
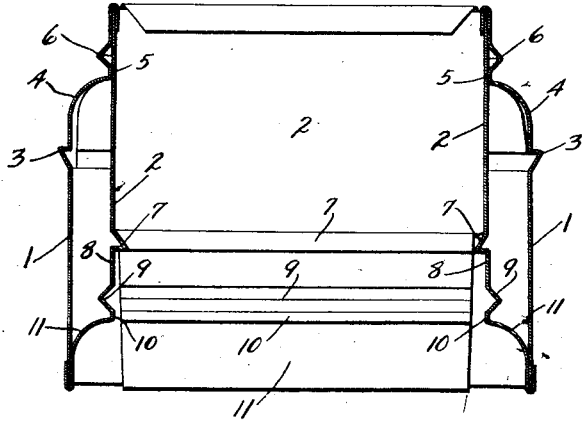
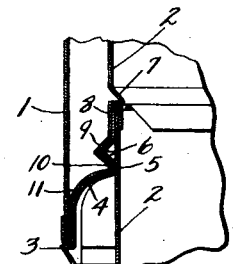
Inventor
Charles J. Holub.
By
Wood & Wood, Attorney Patented Dec. 13, 1927.

1,652,827

UNITED STATES PATENT OFFICE.

CHARLES J. HOLUB, OF COLUMBUS, OHIO, ASSIGNOR TO THE W. E. LAMNECK COMPANY, OF COLUMBUS, OHIO, A CORPORATION OF OHIO.

DOUBLE-WALL CONDUCTOR PIPE.

Application filed January 25, 1923. Serial No. 614,753.

This invention relates to an improvement in sheet metal pipes, primarily to the class of double wall hot air furnace pipes and particularly to the joint for uniting section or length of pipe or fittings together.

An object of the invention is to form the terminal end or end of a double wall sheet metal pipe section or pipe fitting to provide for ready and convenient coupling of one pipe section or fitting with another for installation assembly and for locking the parts together when coupled. The joint is of simple form to which the metal is easily compressed and shaped and adds reinforcing strength to the pipe structure, aside from its coupler characteristics.

The feature of the invention will be more fully set forth in the description of the accompanying drawings forming a part of this application, in which:

Figure 1 is a perspective view of a pipe length or section embodying the improvements.

Figure 2 is a section on line 2, 2, and

Figure 3 is a detailed section showing the mating ends of the sections joined together.

The pipe sections are made in various length sizes of an adopted trade standard for jointing together to meet the general conduit length installation requirements so that in making an installation it is only necessary to select the appropriate number and sizes of pipe lengths which will make a determined conduit length and to join the sections by pressing or forcing the mating ends thereof together and within one another. In this capacity it is desirable to limit the mating depth of the sections and to lock the sections securely together without the employment of auxiliary fastener or locking devices.

Referring to the drawings, which disclose a pipe section of double wall rectangular form, the outer walls, ends and sides, may be regarded as integral, made from a single sheet of metal or of several pieces lap-seamed or otherwise connected, with the seam preferably at the wall corners.

The general practice is to form one end and side walls of an integral piece of metal and lap-seam two of such wall segments together. The side and end inner walls are likewise integral or connected and such methods are commercially followed in making rectangular pipe sections or lengths for cutting the blank in the most efficient and economical manner. The method of making either the outer or inner walls, to obtain the pipe cross-sectional contour, may be treated as separate and distinct from the present invention, which relates to the wall construction for producing the joint ends of the pipe section for uniting the sections under a mating or nesting connection and lockingly engaged so that the following detailed description will be confined to this latter feature.

Also, as the side and end walls are of relatively similar and duplicate construction, the description will be in the singular as to the specific construction of the joint ends of the pipe sides, as it is obvious that the joint construction would lend itself adaptable to a double wall circular contoured pipe or any of the numerous types of furnace pipe fittings.

Each side or end wall of the pipe section comprises an outer wall 1 and an inner wall 2, suitably spaced apart and connected together at their opposite longitudinal ends. The outer wall at one end extends toward the inner with which it connects while the reverse relation follows at the opposite end of the walls to provide for a male joint formation at one end of the pipe section or length, and for a female joint formation at the opposite end, and both of a cross-section configuration to limit the length of telescopic engagement in joining two sections, to interlockingly connect the same and to permit the joint surfaces to contact and mate together for the entire joint length which insures a uniform and complete connection for the entire contour of the two connected sections. The cross-sectional formation of walls is of a design to which the metal is easily shaped and released from the dies.

For the preferred construction as illustrated both inner and outer walls have one plane longitudinal end which lies in relative alternate positions when the inner and outer walls are assembled, while their opposite longitudinal ends are shaped to the joint formations. Thus one end of the outer wall is shaped to extend and engage with the plane end of the inner wall, and likewise one end of the inner wall is shaped to extend toward and engage with the plane end of the outer wall. The outer wall 1 at a limit for the joint length is provided with a V- corrugation 3 extending the full width of the wall which forms a shoulder against which the edge end of wall of a second pipe section engages, as shown in Fig. 3. From the corrugation 3 the metal extends forwardly and laterally, laterally arced or curved, for obtaining the desired degree of inner and outer wall spacing and providing a wall connection portion 4. From the portion 4 the metal is bent at right angles to form a portion 5 which engages with the outer side of the inner wall, the metal extending parallel with said inner wall for a slight measurement. Following the portion 5 the metal is bent to a V-corrugation 6 for the full width of the outer wall which provides a lock ridge for securely connecting the joined pipe sections together. From the lock corrugation the metal extends in a plane parallel with the body portion of the outer wall or in alignment with the portion 5 so as to bear and engage upon the inner wall extended parallel therewith to the edge of the inner wall, and then crimped over the edge of the inner wall and lapping upon the inside surface of the inner wall securely connecting the ends of the inner and outer walls together.

The inner wall 2, at the opposite end from which the outer wall is crimped thereover, is provided with a V-corrugation 7 extending the full width of the inner wall which provides a stop shoulder on the inside of the pipe section for limiting the joint length of insertion, and, therefore, corresponds to the corrugation or ridge 3 on the outside wall at the opposite end of the pipe section. The formation follows with a plane portion 8, an outwardly projecting V-corrugation 9, to provide a recess to recess the lock ridge 6, a plane portion 10, and a curved portion 11, meeting with the inner side surface of the outer wall 1, and then crimped over the edge of the outer wall and lapping over the outside surface of the outer wall for securing the inner wall to the outer. The inner or female joint formation at one longitudinal end of the wall coincides with the outer at the opposite ends of the walls, adapting the joint surfaces to contact their full area when nested together to establish a seal. A slight pressure is required to force the two sections into a union connection and when united are securely connected without the use of auxiliary fastening devices. The corrugations aside from their respective interlocking and stop functions provide transverse reinforcement for giving stability to the metal, preventing the walls from breaking in at their joint ends, avoiding the use of inside cross bars extending between the opposite inside walls. The metal is miter-cut at the edges of the bowed or curved portions 4 for the outside walls and of reduced width from such portion to the end to avoid corner lapping of the metal, while for the inside wall the joint portion is cut straight for the full joint length, or as shown in Fig. 2, approximating the inside dimension of the pipe section to avoid miter cutting or fitting, this practice being a universal following in double wall pipe construction.

Having described my invention, I claim:

1. A double wall sheet metal conduit section comprising spaced inner and outer walls, said walls connected at their opposite longitudinal ends and formed to provide joints for telescopic assembly with respective second conduit sections, the outer wall at one end of the section extending in arcuate form toward the inner wall and in a lap connection therewith and crimped over the edge thereof, the lap portion having in an intermediate part thereof a corrugation extending crosswise of the wall for non-yieldingly interlocking with a corresponding corrugation in the joint end of a second conduit section, the joint at the opposite end of the section being conversely formed and provided with the interlocking corrugation in a yielding portion of the inner wall.

2. A double wall sheet metal conduit section comprising spaced inner and outer walls, said walls connected at their opposite longitudinal ends and formed to provide joints for telescopic assembly with respective second conduit sections, one of the walls at one end of the section extending in arcuate form toward the other wall and in a lap connection therewith and crimped over the edge thereof, the lap portion having in an intermediate part thereof a corrugation extending crosswise of the wall for non-yieldingly interlocking with a corresponding corrugation in the joint end of a second conduit section, the walls at the opposite end of the section being conversely formed, and provided with the interlocking corrugation in a yielding portion of one of the walls.

3. A double wall sheet metal conduit section comprising spaced inner and outer walls, said walls connected at their opposite longitudinal ends and formed to provide joints for telescopic assembly with respective second conduit sections, one of the walls at one end of the section extending toward the other wall and in a lap connection therewith and crimped over the edge thereof, the lap portion having in an intermediate part thereof a corrugation extending crosswise of the wall for non-yieldingly interlocking with a corresponding corrugation in the joint end of a second conduit section, the walls at the opposite end of the section being conversely formed and provided with the interlocking corrugation in a yielding portion of one of the walls.

In witness whereof, I hereunto subscribe my name.

CHARLES J. HOLUB.